Figure 1:
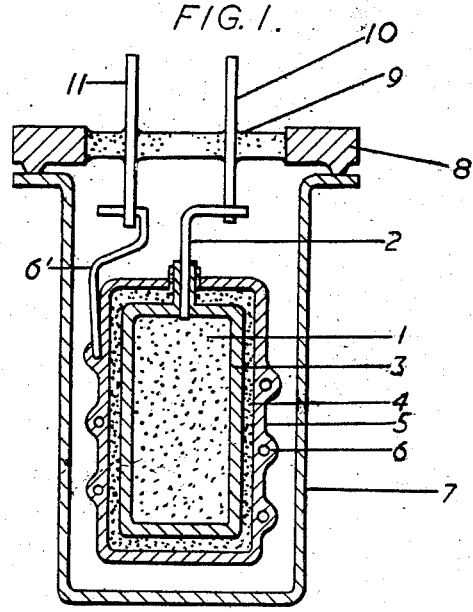

United States Patent Office 3,189,797
Patented June 15, 1965

3,189,797
SOLID ELECTROLYTIC CONDENSER
Eiichi Okamoto, Seizo Suzuki, Takayuki Kurihara, and Yozo Sasaki, all of Tokyo, Japan, assignors to Nippon Electric Company, Limited, Tokyo, Japan, a corporation of Japan
Filed Apr. 20, 1960, Ser. No. 23,566
Claims priority, application Japan, Apr. 23, 1959, 34/23,598
6 Claims. (Cl. 317—230)

This invention relates to cathodes structures for solid electrolytic tantalum capacitors which can be used in a wide temperature range between −100° C. to +200° C.

It is well known that a solid electrolytic tantalum capacitor may be manufactured by the following method: A sintered pourous tantalum metal base, obtained by sintering tantalum metal powder of the order of approximately 100 mesh, is anodized in an electrolyte, such as sulfuric acid, to form an oxide layer on the surface of the said metal base. A film of a semiconductor, such as manganese peroxide, is closely attached to the oxide layer, and the semi-conductor film is coated with a layer of electrical conductor, such as graphite. The graphite coating serves as a cathode and the tantalum base metal serves an an anode of the solid electrolytic tantalum capacitor. After connecting electrical leads to the base metal (anode) and to the graphite coating (cathode), the solid electrolyte capacitor is sealed in a metal case or is moulded with some plastic resin. This invention relates to the construction of the electrical lead connection between the graphite cathode and the cathode lead.

To connect the above mentioned graphite coating and the cathode lead wire for the conventional solid electrolytic capacitor, the following method has been adopted: A metal case is filled with solder, for instance, 50% tin and 50% lead, under melted condition, in which the above tantalum base, covered with manganese dioxide and graphite, metallized with copper is dipped, and then the solder is hardened. According to our experiments, the allowable working temperature range for the solid electrolytic capacitor having such a cathode construction is in the rang between −100° C. and +85° C., and the highest allowable working temperature hitherto known has been +225° C.

According to our studies, the anodic oxide film of tantalum has the construction silimal to a p-i-n junction which has been well know for semiconductors, such as germanium and silicon. Here the n-type layer is the tantalum oxide layer containing excess tantalum atoms, located adjacent to the base metal. The thickness of the n-layer is estimated to be in the range of 20–50 A. The p-type layer is located in the surface layer of the oxide film, and its thickness is about the same as that of the n-layer. The acceptor levels contained in the p-type layer are believed to consist of oxygen atoms or ions sorbed or absorbed in and/or on the surface of the oxide film. The i-type is located between the p-type and n-type layer, and the thickness of the i-layer is proportional to the anodizing voltage. Since the andoic oxide film has such a construction, it is desirable to construct the capacitor by using the oxide film so that the effective impurity concentration does not change much. According to our experiments, if the working voltage of the solid electrolytic capacitor is in the range of ½ to ⅓ of the anodizing voltage, the movement of the impurity in the n-layer at 150° C. can be neglected in the oxide film obtained by anodizing under suitable conditions. If the working voltage is reduced to about ½ of that of the solid electrolytic capacitor to be used at 150° C., the movement of the impurity in the n-layer can be neglected even at 200° C. As to the movement of the acceptor level in the p-type layer, if the atmosphere surrounding the oxide is one oxygen atmosphere or more, the desorption of the sorbed excess oxygen in the surface oxide layer or the absorbed oxygen on the oxide surface described previously, is exceedingly small below 300° C.

From the facts mentioned above, it should be possible by using the anodic oxide film of tantalum to obtain the solid electrolytic capacitor that can be used up to 200° C. In fact, the solid electrolytic capacitor described in U.S. Patent No. 2,836,776, hardly changes during a life test of 10,000 hours in the temperature range between −200° C. and +150° C., and it was able to withstand a life test of 1000 hours in the temperature range from −200° C. to +200° C. Consequently, it should be possible to obtain the said solid electrolytic capacitor using maganese dioxide to withstand +200° C. in service. It is considered that the reason why the allowable working temperature range of the conventional solid electrolytic tantalum capacitor, which is described previously, is limited to from −100° C. to +125° C., is because of cracks in the oxide layer caused by mechanical strain from the thermal expansion of solder, which electrically connects the graphite coating and the metal case.

This invention is characterized by the removal of the above-mentioned mechanical strain from the anodic oxide film by adopting the cathode construction which will be described later.

Figure 2:
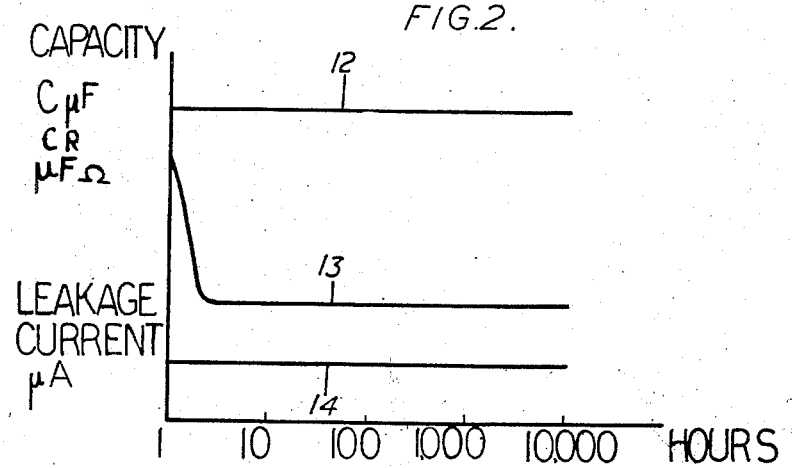

The above-mentioned and other features and objects of this invention and the manner of attaining them will become more apparent and the invention itself will be best understood by reference to the following description of an embodiment of the invention taken in conjunction with the accompanying drawings, in which:

FIG. 1 is a cross section of the solid electrolytic capacitor of this invention, and FIG. 2 shows curves representing a change of capacity of the condenser in the course of life test.

In FIG. 1, 1 is the porous tantalum metal base obtained by sintering the tantalum metal powder. 2 is the tantalum wire for making the connection to said base. The surfaces of the tantalum base metal and wire are covered by the anodic oxide film of tantalum formed by anodic oxidation at a specified voltage. 3 is the manganese dioxide layer formed, for instance, by the thermal decomposition of maganese nitrate, closely attached to the anodic oxide film. 4 is the graphite layer coating the said manganese dioxide layer. 6 and 6′ are the metal wires, for instance nickel wires, wound in several turns lightly around graphite layer. The said metal wire together with the metal layer 5 metallized on the surface of the graphite layer, covers the outside of the graphite, and serves as a cathode lead.

It is desirable that the metal to be metallized will not melt at the working temperature of the solid electrolytic capacitor, and that the metal is soft.

According to our experiments, lead, solder containing a large amount of lead, copper, and brass were effective as metallizing metals. It is desirable that the thickness of the metal layer metallized on the graphite and on the wire be comparatively thin. According to experiments, for comparatively soft metals, such as lead and solder, suitable thickness of the metals is in the range between 0.1 and 1.2 mm., while for comparatively hard metals, such as copper and brass, it is desirable that the thickness of the metallized layer be still thinner. The reason why lead and its alloys, copper and its alloys, give good results, seems to lie in the good electrical conductivity of their oxides. The tantalum wire 2 and the wire 6′ are welded to the anode and the cathode lead wires 10 and 11, respectively.

Both electrodes 10 and 11 are supported by fusing to the glass part 9 which is fused to the metal cover 8. The capacitor is completely shielded from outside by electrically welding the said cover 8 to the metal case 7. Needless to say, oxygen or other oxidizing atmosphere is desirable for the atmosphere in the container.

FIG. 2 shows the results of the high temperature life tests of the solid electrolytic capacitor embodying the features of this invention. The time of the life test at 200° C. is taken as abscissa, and capacity (C), the product of capacity and equivalent series resistance (CR), and the leakage current at the rated working voltage of 35 v., measured at room temperature, are taken as ordinates. The curves 12, 13 and 14 show respectively the changes of C, CR, and the leakage current as a function of time. The normal applied voltage during the course of life test was 20 volts. As can be seen from the figure, C and the leakage current hardly change during the first 7,000 hours, while CR, decreases to ⅓ to ⅕ of the original value several hours after the starting of the life test, hardly changing thereafter.

As described above, the capacitor embodying the features of this invention can withstand more than 7,000 hours at the high temperature of 200° C., the temperature at which the conventional solid electrolytic capacitor could hardly be used. It is believed that the effect is ascribed to the wire wound on the graphite layer that acts as a spring, and also the thin metallized layer, because the mechanical strains produced by these metals due to temperature change are much reduced and do not damage seriously the anodic oxide film. The characteristics of the solid electrolytic capacitor embodying the features of this invention, other than temperature characteristics, were exactly the same as those of the conventional solid electrolytic capacitor.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. A cathode structure for a solid electrolytic capacitor; having a metal base, an oxide coating on the base, a semiconductor coating on the oxide coating, and an electrically conducting layer on the semiconductor coating; comprising a cathode lead wire, the majority of which is lightly wrapped in a plurality of turns in the form of a relatively open wound helix about said electrically conducting layer, and a metal over-layer having a maximum thickness of 1.2 mm. on said electrically conducting layer and said wire.

2. A cathode structure for a solid electrolytic capacitor as claimed in claim 1 in which the metal over-layer is composed of a soft metal and is 0.1 to 1.2 mm. thick.

3. A cathode structure for a solid electrolytic capacitor as claimed in claim 1 in which the metal over-layer is composed of a hard metal and is less than 0.1 mm. thick.

4. A cathode structure for a solid electrolytic capacitor as claimed in claim 1 in which the cathode lead wire is embedded in the metal over-layer.

5. A cathode structure for a solid electrolytic capacitor as claimed in claim 1 in which the cathode lead wire is nickel and the electrically conducting layer is graphite.

6. The method of making a cathode structure for a solid electrolytic capacitor having an outer electrically conducting coating comprising the steps of lightly wrapping the majority of a cathode lead wire about said outer coating in a plurality of progressive relatively widely spaced turns, and forming a metal coating of a maximum thickness of 1.2 mm. on said outer coating which embeds the wrapped portion of said cathode lead wire.

References Cited by the Examiner
UNITED STATES PATENTS

| | | | |
|---|---|---|---|
| 1,678,824 | 7/28 | Ruben | 317—233 X |
| 1,906,691 | 5/33 | Lilienfeld | 317—230 |
| 2,005,279 | 6/35 | Van Geel | 317—233 X |
| 2,398,088 | 4/46 | Ehlers et al. | 317—242 X |
| 2,578,667 | 12/51 | Brennan | 317—230 |
| 2,936,514 | 5/60 | Millard | 317—230 |

FOREIGN PATENTS 747,051    3/56    Great Britain.

DAVID J. GALVIN, *Primary Examiner.*

SAMUEL BERNSTEIN, JAMES D. KALLAM,
*Examiners.*